United States Patent [19]

Chino

[11] Patent Number: 4,857,717
[45] Date of Patent: Aug. 15, 1989

[54] AUTOMATIC FOCUSING DEVICE USING A LIGHT SENSOR OF CENTER-SPLIT TYPE

[75] Inventor: Yasuaki Chino, Katsuta, Japan
[73] Assignee: Hitachi, Ltd., Tokyo, Japan
[21] Appl. No.: 108,432
[22] Filed: Oct. 14, 1987

[30] Foreign Application Priority Data

Oct. 14, 1986 [JP] Japan .............................. 61-242094

[51] Int. Cl.[4] .......................... G02B 7/04; G03B 3/10
[52] U.S. Cl. .................................. 250/201; 250/204; 354/403; 358/227
[58] Field of Search ................ 250/201, 204; 354/402, 354/403; 358/227

[56] References Cited

U.S. PATENT DOCUMENTS 4,755,662 7/1988 Fujiwra et al. ...................... 250/204

Primary Examiner—Edward P. Westin
Attorney, Agent, or Firm—Antonelli, Terry & Wands

[57] ABSTRACT

An automatic focusing device for use in a video camera comprises a first and a second light-receiving element, a first and a second integration circuit integrating output signals of the first and second light-receiving elements respectively and each having a function of proportional current integration and a function of fixed current integration, a first and a second comparator comparing integration output voltages of the first and second integration circuits with the same threshold voltage respectively, a microcomputer producing a focusing signal by detecting the period of time from a time when one of the integration output voltages of the first and second integration circuits reaches the level of the threshold voltage to a time when the other integration output voltage reaches the level of the threshold voltage, and a detection circuit detecting that one of the integration output voltages of the first and second integration circuits reaches the level of the threshold voltage on the basis of the comparator output signals, thereby changing over the operation mode of the integration circuits from the proportional current integration mode to the fixed current integration mode.

4 Claims, 7 Drawing Sheets

FIG. 3A
PRIOR ART
FIG. 3B
PRIOR ART
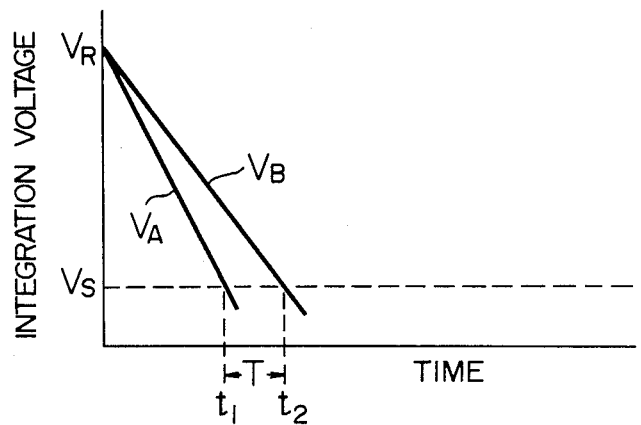
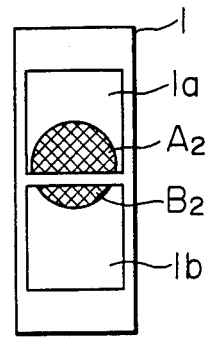
FIG. 4
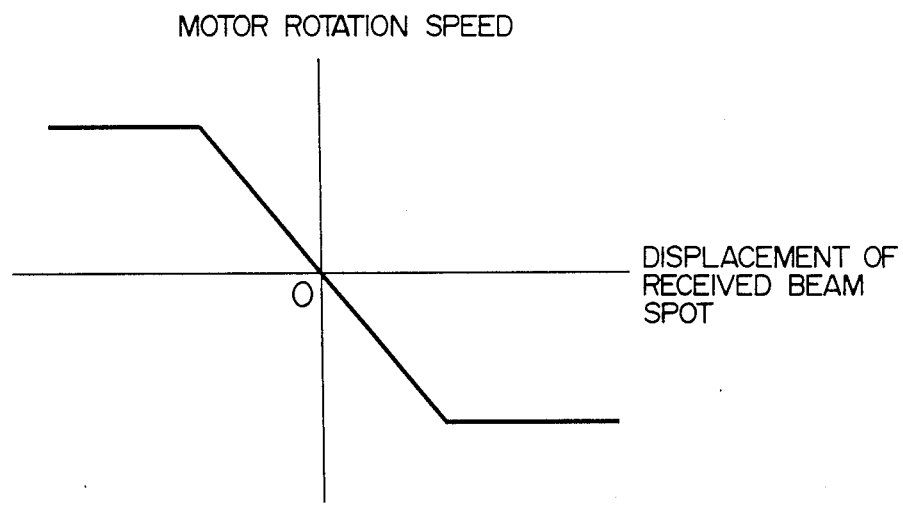

AUTOMATIC FOCUSING DEVICE USING A LIGHT SENSOR OF CENTER-SPLIT TYPE

BACKGROUND OF THE INVENTION

This invention relates to an automatic focusing device suitable for use in an apparatus such as a video camera.

An automatic focusing device for use in an apparatus such as a video camera is known from the disclosure of, for example, Japanese Patent Publication No. 56-54610 published on Dec. 26, 1981.

The disclosed automatic focusing device comprises a light emitting element and a center-split light sensor including a pair of light-receiving elements. A beam of light emitted from the light-emitting element and reflected from a subject being photographed is received by the two-parts of the center-split light sensor. A confusing signal is obtained by detecting a displacement of a spot of the reflected light beam projecting onto the light sensor from its center based on a difference between the outputs of the two parts of the center-split light sensor.

In such an automatic focusing device, a motor is rotated by a controlled amount required for bringing the camera's lens system to the position of sharp focusing when such beam spot displacement is detected. The controlled amount of rotation of the motor is determined by the focusing signal which is variable according to a detected period of time T, that is, the time difference $(t_1-t_2)$ between times $t_1$ and $t_2$ at which integrated voltages $V_A$ and $V_B$ obtained by integrating output signals Sa and Sb of the two parts of the light-receiving elements, respectively attain the level of a threshold voltage (a reference voltage) $V_S$. Therefore, it is possible that the time period T and the corresponding focusing signal obtained in one case are the same as those obtained in another case even though the amount of displacement of the beam spot from a center of the light sensor in the former case is different from that in the latter case. As a result, in one of the cases where the amount of beam spot displacement is smaller than that in the other case, the amount of focus adjustment by the focusing signal is excessively large, resulting in hunting. On the other hand, in the other defocusing case where the amount of beam spot displacement is larger than that in the one case, the amount of focus adjustment by the focusing signal is excessively small, resulting in a considerably slow response speed.

SUMMARY OF THE INVENTION

It is an object of the present invention to solve such a prior art problem and to provide an automatic focusing device which can always operate at a high response speed in spite of a simple structure.

The automatic focusing device of the present invention comprises two integration circuits to which output signals of two light-receiving elements, included in a center-split light sensor are applied respectively. Each integration circuit can operate selectively as a function of the integration of a current proportional to the output signal of the associated light-receiving element (referred to hereinafter as a function of proportional current integration) and as a function of the integration of a fixed current determined by the time constant provided to that integration circuit (referred to hereinafter as a function of fixed current integration). When one of the integration output voltages of these two integration circuits attains the level of a predetermined threshold voltage, the operation mode of these two integration circuits is simultaneously changed over from the proportional current integration mode to the fixed current integration mode, and a focusing signal is produced by detecting the period of time from the time when the one integration output voltage attains the level of the threshold voltage to the time when the other integration output voltage attains the threshold voltage level.

According to the present invention, the focusing signal thus obtained exclusively depends on the amount of the received beam spot displacement at the center-split light sensor, so that the focus can be adjusted at a speed corresponding to the amount of beam spot displacement, thereby preventing hunting and slow response. Thus, the present invention provides an automatic focusing device which can smoothly and reliably carry out the focusing operation in spite of its simplified structure.

BRIEF DESCRIPTION OF THE DRAWINGS

FIGS. 3A and 3B illustrate the operation of the device when a subject is located relatively near the camera.

FIG. 4 is a graph showing an ideal relation between the amount of received beam spot displacement at the center-split light sensor and the rotation speed of a motor, controlling the position of the camera's lens system.

DESCRIPTION OF THE PREFERRED EMBODIMENTS

The principle of operation of an automatic focusing device of the prior art, an improvement of which the present invention is aimed at, will be first described with reference to FIGS. 1A and 1B.

Figure 1A:
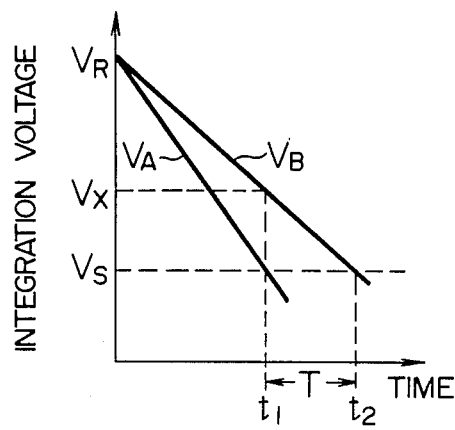
FIGS. 1A and 1B illustrate the principle of operation of an automatic focusing device incorporated in, for example, a video camera.
Figure 1B:
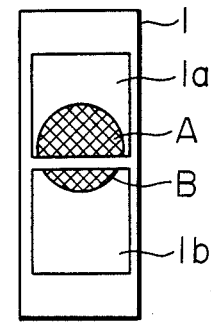

A center-split light sensor 1 includes a pair of light-receiving elements 1a and 1b as shown in FIG. 1B and is mounted in a video camera (not shown) to receive a beam of light emitted from a light-emitting element (not shown) provided to the video camera and reflected from a subject being photographed. The beam of light reflected from the subject and received by the center-split light sensor 1 forms a beam spot of received light on the surface of the center-split light sensor 1 on which the light-receiving elements 1a and 1b are provided. When the camera's lens system is in sharp focus, that is, when the beam spot of received light is not displaced relative to the light-receiving elements 1a and 1b, these elements 1a and 1b receive the same amount of light.

When now the beam spot of light received by the center-split light sensor 1 is displaced toward the light-receiving element 1a as shown by the hatching in FIG. 1B, the amount of light A received by the light-receiving element 1a is larger than the amount of light B received by the light-receiving element 1b. Since each of the light-receiving elements 1a and 1b generates an output signal having an amplitude proportional to the amount of received light, the amplitude of the output signal of the light-receiving element 1a is larger than that of the output signal of the light-receiving element 1b.

The output signals of the light-receiving elements 1a and 1b are integrated by integration circuits respectively. Each of these integration circuits carries out integration by charging or discharging a capacitor with a current having a value proportional to a voltage value of its input signal. This mode of integration is referred to hereinafter as a proportional current integration mode. Suppose now that $V_R$ is an initial voltage (that is, a reset voltage) of each of these integration circuits. Then, as shown in FIG. 1A, an integration output voltage $V_A$ of the integration circuit, to which the output signal of the light-receiving element 1a is applied, changes from the reset voltage $V_R$ with a gradient steeper than that of an integration output voltage $V_B$ of the integration circuit to which the output signal of the light-receiving element 1b is applied.

These integration output voltages $V_A$ and $V_B$ of the integration circuits are compared with a predetermined threshold voltage $V_S$ in the associated comparators, respectively. FIG. 1A illustrates that the integration output voltage $V_A$ attains the level of the threshold voltage $V_S$ at a time $t_1$, while the integration output voltage $V_B$ attains the level of the threshold voltage $V_S$ at a time $t_2$. The period of time T from the time $t_1$ to the time $t_2$ is detected, and a focusing signal is produced on the basis of the detected period of time T. This focusing signal is used to drive a lens-system drive motor so that the camera's lens system is moved to a position where an image of the subject is focussed on a focusing plane (not shown) of the video camera and simultaneously, the center-split light sensor 1 shown in FIG. 1B is also shifted so that the light-receiving elements 1a and 1b receive the same amount of light of the received beam spot.

In FIG. 1A, the integration output voltages $V_A$ and $V_B$ are expressed as follows:

$$V_A = V_R - kAt$$

$$V_B = V_R - kBt$$

where k is a constant.

Therefore, the period of time T elapsed until the integration output voltage $V_B$ attains the level of the threshold voltage $V_S$ at the time $t_2$ after the integration output volta $V_A$ has attained the level of the threshold voltage $V_S$ at the time $t_1$ is expressed as follows:

$$T = t_2 - t_1 = \frac{V_R - V_S}{k} \cdot \left(\frac{1}{B} - \frac{1}{A}\right) \quad (1)$$

The equation (1) is rewritten as follows:

$$T = \frac{V_R - V_S}{kA} \cdot (\alpha - 1) \quad (2)$$

where $\alpha$ is the ratio A/B between the amounts of light A and B received by the respective light-receiving elements 1a and 1b.

This ratio $\alpha$ changes according to the amount of displacement of the received beam spot on the center-split light sensor 1. However, even when the intensity of the reflected beam of light may change, this ratio $\alpha$ does not change, provided that the amount of displacement of the received beam spot is constant. Therefore, the amount of displacement of the received beam spot can be represented by the ratio $\alpha$ between the amounts of light received by the respective light-receiving elements 1a and 1b.

According to the equation (2), however, the period of time T, which naturally changes as a function of the ratio $\alpha$, changes also as a function of the amount of light A received by the light-receiving element 1a. Therefore, there may occur two defocusing cases such that the periods of time T detected in both cases are different from each other due to different intensities of the reflected and received beam of light although the amounts in both cases of displacement of the received beam spot are equal to each other. In such cases, different focusing signals are produced for controlling the camera's lens system. On the other hand, there may also occur two defocusing cases such that the ratio $\alpha$ between the amounts of light received by the light-receiving elements 1a and 1b is different in one case from that in the other case due to different intensities of the reflected light beams, but the detected periods of time T are not different in both cases. In such cases, the same focusing signal is produced for controlling the camera's lens system. The intensity of the reflected light beam is different depending on whether the subject being photographed is located relatively remote from or near to the video camera and also different depending on whether the reflection factor of the subject is high or low.

The period of time T detected when the subject being photographed is located relatively near the video camera may become the same as that detected when the subject is located relatively remote from the video camera. An example of such a situation will be described with reference to FIGS. 2A, 2B and FIGS. 3A, 3B.

Figure 2A:
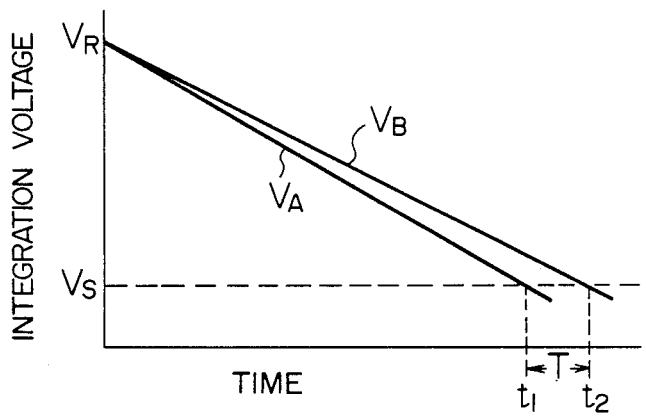
FIGS. 2A and 2B illustrate the operation of the device when a subject is located relatively remote from the camera.
Figure 2B:
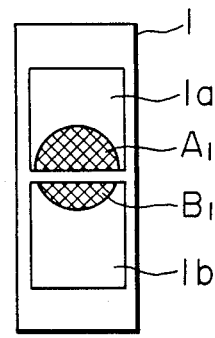

FIGS. 2A and 2B correspond to the case where the subject is located relatively remote from the video camera, while FIGS. 3A and 3B correspond to the case where the subject is located relatively near the video camera. It is supposed that the amount of displacement of a beam spot of light received by the center-split light sensor 1 shown in FIG. 2B differs from that of a beam spot of light received by the center-split light sensor 1 shown in FIG. 3B. Also, it is supposed that, in each of the above cases, the amount of light received by the light-receiving element 1a is larger than that of the light-receiving element 1b.

In the case where the subject is located relatively remote from the video camera, the beam of light reflected from the subject and received by the center-split light sensor 1 has a low intensity. Therefore, the integration output voltage $V_A$ of the integration circuit integrating the output signal of the light-receiving element 1a and the integration output voltage $V_B$ of the integration circuit integrating the output signal of the light-receiving element 1b change with time with a moderate gradient as shown in FIG. 2A, although they differ from each other, and attain the level of the threshold voltage $V_S$ at times $t_1$ and $t_2$ respectively. The period of time T is detected as the difference between the times $t_1$ and $t_2$.

Suppose that $A_1$ and $B_1$ in FIG. 2B are the amounts of light received by the respective light-receiving elements 1a and 1b, and $\alpha_1$ is the ratio $A_1/B_1$ between the amounts of received light $A_1$ and $B_1$. Then, from the equation (2), the detected period of time T is expressed as follows:

$$T = \frac{V_R - V_S}{k} \cdot \frac{\alpha_1 - 1}{A_1} \quad (3)$$

On the other hand, in the case where the subject is located relatively near the video camera, the beam of light reflected from the subject and received by the center-split light sensor 1 has a high intensity. Therefore, as shown in FIG. 3A, the integration output voltages of the integration circuits integrating the output signals of the light-receiving elements 1a and 1b respectively change with time with a gradient steeper than in the case where the subject is located relatively remote from the video camera, although they differ from each other, and attain the level of the threshold voltage $V_S$ at times $t_1$ and $t_2$ respectively. The period of time T is detected as the difference between the times $t_1$ and $t_2$.

Suppose that $A_2$ and $B_2$ in FIG. 3B are the amounts of light received by the respective light-receiving elements 1a and 1b, and $\alpha_2$ is the ratio $A_2/B_2$ between the amounts of received light $A_2$ and $B_2$. Then, from the equation (2), the detected period of time T is expressed as follows:

$$T = \frac{V_R - V_S}{k} \cdot \frac{\alpha_2 - 1}{A_2} \quad (4)$$

The amounts of received light $A_1$ and $A_2$ have respectively different values, and the ratio $\alpha_1$ and $\alpha_2$ have also respectively different values. The values of T given by the equations (3) and (4) are equal to each other when the following relation is satisfied:

$$\frac{A_2}{A_1} = \frac{\alpha_2 - 1}{\alpha_1 - 1} \quad (5)$$

Therefore, the period of time T detected when the subject is located relatively remote from the video camera and that detected when the subject is located relatively near the video camera are equal to each other regardless of the different amounts of beam spot displacement on the center-split light sensor 1.

For example, the above equation (5) holds when $A_2/A_1=2$, $\alpha_1=2$ and $\alpha_2=3$. In this case, the intensity of the reflected beam of light in FIG. 3 representing the case where the subject is located relatively near the video camera is 16/9 times as large as that in FIG. 2 representing the case where the subject is located relatively remote from the video camera.

As described above, there are two defocusing cases such that the detected period of time T is different in one case from that in the other case although the amounts of displacement of the received beam spot on the center-split light sensor 1 are equal to each other. On the other hand, there are also two defocusing cases such that the detected periods of time T in both cases are equal to each other although the amount of displacement of the received beam spot is different in one case from that in the other case. In any of the above cases, the focusing operation of the lens system is carried out by using the focusing signal produced on the basis of the detected period of time T, and during the focusing operation of the lens system, the next detection of the period of time T is carried out. In this manner, the focusing control is carried out while successively detecting the period of time T, so as to bring the camera's lens system into the position of sharp focusing.

However, such an automatic focusing device involves the aforementioned problems of hunting and a considerably slow response.

Such problems would be obviated by a method in which the focusing signal is produced on the basis of the value $V_X$ of the integration output voltage $V_B$ at the time $t_1$ at which the other integration output voltage $V_A$ has attained the level of the threshold voltage $V_S$ in FIG. 1A, so as to use such a focusing signal for the focusing operation of the lens system. In such a case, the voltage value $V_X$ must be identified. However, since continuous identification of the voltage value $V_X$ is impossible as a matter of fact, an ideal motor rotation characteristic curve as shown in FIG. 4 is approximated by a stepped characteristic curve including n stages so as to identify correspondence of the voltage value $V_X$ to one of the n stages. However, for the purpose of identification of the voltage value $V_X$ in the manner described above, at least n comparators or equivalents are required, resulting in complexity of the device and leading to the loss of economy.

The present invention obviates all of the problems pointed out above.

Preferred embodiments of the present invention will now be described in detail with reference to the drawings.

Figure 5:
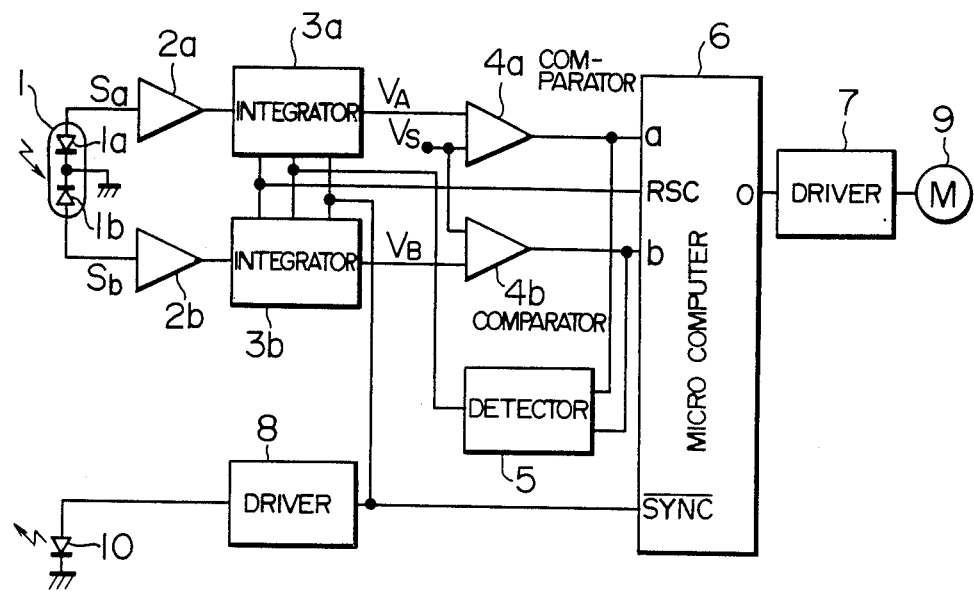
FIG. 5 is a block diagram showing the structure of a preferred embodiment of the automatic focusing device according to the present invention, when incorporated in a video camera.

FIG. 5 is a block diagram showing the structure of a preferred embodiment of the automatic focusing device according to the present invention when applied to a video camera, and, in FIG. 5, like reference numerals and symbols are used to designate like parts and signals appearing in FIGS. 1A and 1B. Reference numeral 1 designates a center-split light sensor; 1a and 1b, light-receiving elements (photo diodes); 2a and 2b, amplifiers; 3a and 3b, integration circuits; 4a and 4b, comparators; 5, a detection circuit; 6, a microcomputer; 7 and 8, driver circuits; 9, a motor; and 10, a light-emitting element.

The light sensor 1 shown in FIG. 5 is provided with the two light-receiving elements 1a and 1b like those shown in FIG. 1B. The light-receiving elements 1a and 1b receive a beam of light emitted from the light-emitting element 10 and reflected from a subject being photographed and generate output signals $S_a$ and $S_b$ representing the amounts of the received light beam respectively. These signals $S_a$ and $S_b$ are applied to the integration circuits 3a and 3b after being amplified by the amplifiers 2a and 2b respectively. Integration output voltages $V_A$ and $V_B$ of the integration circuits 3a and 3b are applied to the comparators 4a and 4b to be compared with fixed threshold voltages (reference voltages) $V_S$ respectively. Herein, the threshold voltage $V_S$ is commonly applied to the comparators 4a and 4b. The resultant output signals of the comparators 4a and 4b are applied to input terminals a and b of the microcomputer 6 respectively. The microcomputer 6 detects the period of time T from the time when one of the integration output voltages $V_A$ and $V_B$ of the integration circuits 3a and 3b reaches the level of the threshold voltage $V_S$ to the time when the other integration output voltage reaches the level of the threshold voltage $V_S$, and, on the basis of the detected period of time T, a focusing signal is produced. According to the present invention, however, the integration circuits 3a and 3b operate initially in the proportional current mode and change to operate in the fixed current mode immediately when one of the integration output voltages $V_A$ and $V_B$ reaches the threshold voltage $V_S$, as will be mentioned in more detail hereinafter. This focusing signal is applied to the driver circuit 7 from an output terminal o of the microcomputer 6. The driver circuit 7 rotates the motor 9 by the amount corresponding to the duty factor of the focusing signal, so that the camera's lens system is brought into the position of sharp focusing. At the same time, the center-split light sensor 1 is shifted so that the light-receiving elements 1a and 1b now receive the same amount of light. The focusing signal generated from the microcomputer 6 acts to rotate the motor 9 in one direction or the other depending on whether the integration output voltage $V_A$ attains the level of the threshold voltage $V_S$ earlier or later than the other integration output voltage $V_B$.

In order to synchronize the repeated operations of the integration circuits 3a and 3b with periodical light emissions of the light-emitting element 10, the microcomputer 6 generates periodically a synchronizing signal $\overline{SYNC}$ and a reset signal RSC at the same frequency. Each synchronizing signal $\overline{SYNC}$ is applied to the driver circuit 8 for causing the light-emitting element 10 to emit a beam of light for a predetermined time interval which is longer than a possible maximum time interval generally required for any earlier one of $V_A$ and $V_B$ to reach the threshold voltage $V_S$ after initiation of the integration of the output of the amplifier 2a or 2b, but shorter than one cycle period in generation of the periodic synchronizing signals. The reset signal RSC is applied to the integration circuits 3a and 3b thereby resetting the integration circuits so that the integration circuits are ready for integration operation in the next cycle. The synchronizing signals $\overline{SYNC}$ and the reset signals RSC are synchronized with each other but each synchronizing signal is produced slightly earlier than the associated reset signal so that the integrations by the integration circuits start immediately after these circuits are reset.

The integration circuits 3a and 3b have a function of integration according to the current values of the signals $S_a$ and $S_b$ amplified by the amplifiers 2a and 2b respectively (that is, a function of so-called proportional current integration) and a function of integration according to fixed current values determined by the RC time constants of the integration circuits 3a and 3b respectively (that is, a function of so-called fixed current integration). These functions are changed over by a detection output signal of the detection circuit 5.

Figure 6A:
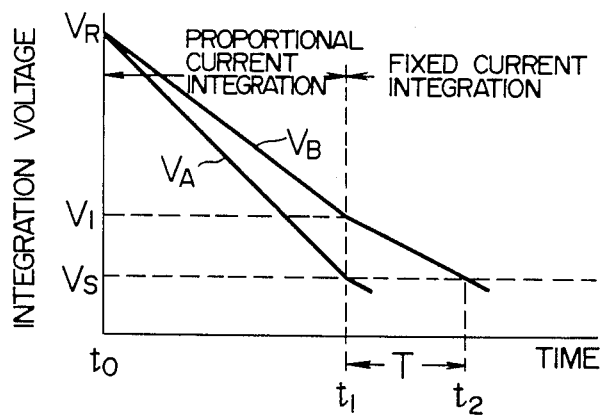
FIGS. 6A and 6B illustrate how the microcomputer shown in FIG. 5 detects the period of time T on the basis of integration output voltages of the integration circuits.
Figure 6B:
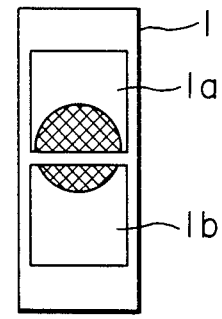

More precisely, as shown in FIG. 6A, the integration circuit 3a operates in the proportional current integration mode after it is reset at time $t_0$ by the combination of the synchronizing signal $\overline{SYNC}$ and the reset signal RSC. The output signals of the comparators 4a and 4b are applied to the detection circuit 5. When, after the integration circuits 3a and 3b have been reset, one of the integration output voltages $V_A$ and $V_B$ of the respective integration circuits 3a and 3b attains the level of the threshold voltage $V_S$ of the comparators 4a and 4b at time $t_1$, the detection circuit 5 detects the attainment of the threshold voltage level and acts to change over the operation mode of the integration circuits 3a and 3b from the proportional current integration mode to the fixed current integration mode. Therefore, the period of time T detected by the microcomputer 6 is the period of $(t_2-t_1)$ elapsed until, after one of the integration output voltages $V_A$ and $V_B$ of the respective integration circuits 3a and 3b has attained the level of the threshold voltage $V_S$ at time $t_1$, these integration circuits 3a and 3b operate in the fixed current integration mode, and the other integration output voltage attains the level of the threshold voltage $V_S$ at time $t_2$.

Next, the integrating operation of these integration circuits 3a and 3b will be described in further detail with reference to FIGS. 7A, 7B and FIGS. 8A, 8B.

Figure 7A:
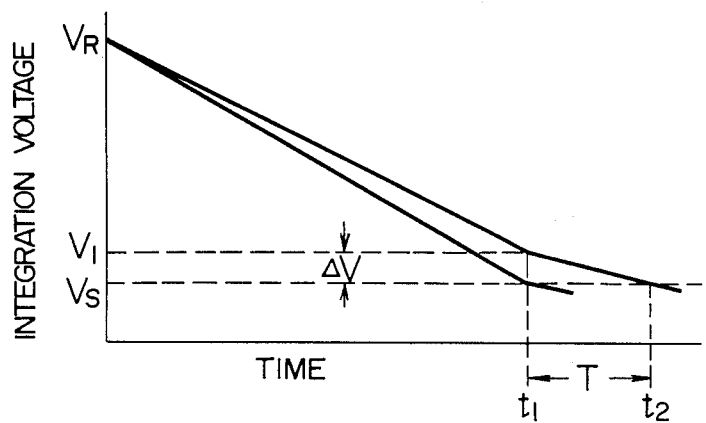
FIGS. 7A and 7B illustrate the manner of detection of the period of time T when a subject is located relatively remote from the camera.
Figure 7B:
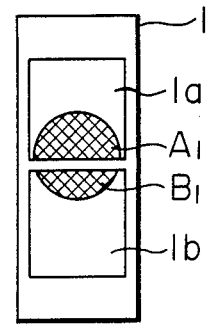
Figure 8A:
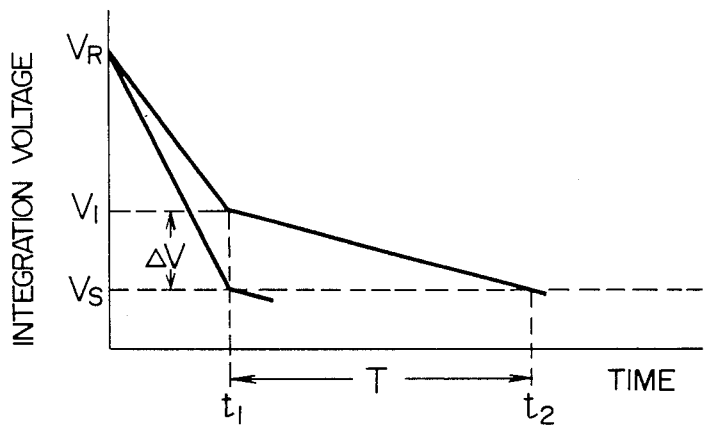
FIGS. 8A and 8B illustrate the manner of detection of the period of time T when a subject is located relatively near the camera.
Figure 8B:
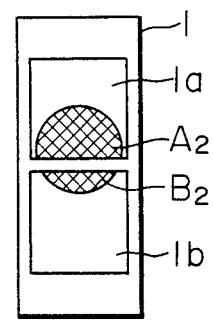

FIGS. 7A and 7B show the case where the subject is located relatively remote from the video camera, while FIGS. 8A and 8B show the case where the subject is located relatively near the video camera. It is supposed that the intensity of the beam of light reflected from the subject and received by the center-split light sensor 1 and the amount of displacement of the received beam spot in FIG. 7B differ from those in FIG. 8B.

Referring first to FIGS. 7A and 7B showing the case where the subject is located relatively remote from the video camera, the amount of light $A_1$ received by the light-receiving element 1a is larger than that $B_1$ received by the light-receiving element 1b although the amounts of light $A_1$ and $B_1$ received by the respective light-receiving elements 1a and 1b are not large in themselves. In this case, the integration output voltages $V_A$ and $V_B$ of the respective integration circuits 3a and 3b operating in the proportional current integration mode after having been reset change from the reset voltage $V_R$ with time with a gentle gradient. Since the rate of change of the integration output voltage $V_A$ is larger than that of the integration output voltage $V_B$, the integration output voltage $V_A$ attains the level of the threshold voltage $V_S$ of the comparator 4a at time $t_1$ earlier than the integration output voltage $V_B$. The value of the integration output voltage $V_B$ at this time $t_1$ is $V_1$. In the proportional current integration mode, the integration output voltages $V_A$ and $V_B$ change with time with gradients which are proportional to the amounts $A_1$ and $B_1$ of light received by the light-receiving elements 1a and 1b respectively. Therefore, the voltages $V_1$ and $V_S$ are expressed as follows:

$$V_1 = V_R - k' \cdot B_1 t_1 \quad (6)$$

$$V_S = V_R - k' \cdot A_1 t_1 \quad (7)$$

where $t_1$ is the time at which the integration output voltage $V_A$ attains the level of the threshold voltage $V_S$, and $k'$ is a constant.

Therefore, the difference $\Delta V$ between the integration output voltage $V_B$ and the threshold voltage $V_S$ at time $t_1$ is given by $$\Delta V = V_1 - V_S = k'(A_1 - B_1)t_1 \quad (8)$$

Substitution of the equation (7) into the equation (8) provides the following equation:

$$\Delta V = (V_R - V_S) \cdot \left(1 - \frac{B_1}{A_1}\right) \quad (9)$$

After the time $t_1$, the integration circuits 3a and 3b operate in the fixed current integration mode, and the integration output voltage $V_B$ of the integration circuit 3b changes with time with a fixed gradient $k''$. Therefore, the period of time T during which the integration output voltage $V_B$ changing from the value $V_1$ attains the level of the threshold voltage $V_S$, that is, the period of time T during which the difference between the integration output voltage $V_B$ and the threshold voltage $V_S$ decreases from $\Delta V$ to zero, is expressed as follows:

$$T = \frac{\Delta V}{k''} = \frac{V_R - V_S}{k''} \cdot \left(1 - \frac{B_1}{A_1}\right) \quad (10)$$

Similarly, in the case of FIGS. 8A and 8B illustrating the case where the subject is located relatively near the video camera, the period of time T is expressed as follows:

$$T = \frac{\Delta V}{k''} = \frac{V_R - V_S}{k''} \cdot \left(1 - \frac{B_2}{A_2}\right) \quad (11)$$

In the equations (10) and (11), the ratios $B_1/A_1$ and $B_2/A_2$ are different from each other although $V_R$, $V_S$ and $k''$ are constant. Therefore, the periods of time T given by the equations (10) and (11) are not the same. The microcomputer 6 shown in FIG. 5 computes the detected period of time T to produce the focusing signal corresponding to the ratio $B_1/A_1$ or $B_2/A_2$ and applies the signal to the driver circuit 7 (FIG. 5) from its output terminal o.

It will be seen from the above description that, in the illustrated embodiment, the ratio between the amounts of light received by the light-receiving elements 1a and 1b is detected. This ratio represents the amount of displacement of the received beam spot from the center of the center-split light sensor 1, that is, the boundary between the light-receiving elements 1a and 1b. The motor 9 shown in FIG. 5 is controlled so that the amount of received beam spot displacement is decreased to zero, that is, the amounts of light received by the light-receiving elements 1a and 1b become equal to each other to provide the ratio of 1 (unity) therebetween. In this case, the ratio is independent of the intensity of the beam of light reflected from the subject and received by the center-split light sensor 1. Therefore, the amount of rotation of the motor 9 is controlled according to the amount of displacement of the received beam spot only, and a situation as described already would not occur in which the motor 9 is rotated by the same amount regardless of different amounts of displacement of the received beam spot.

Figure 9:
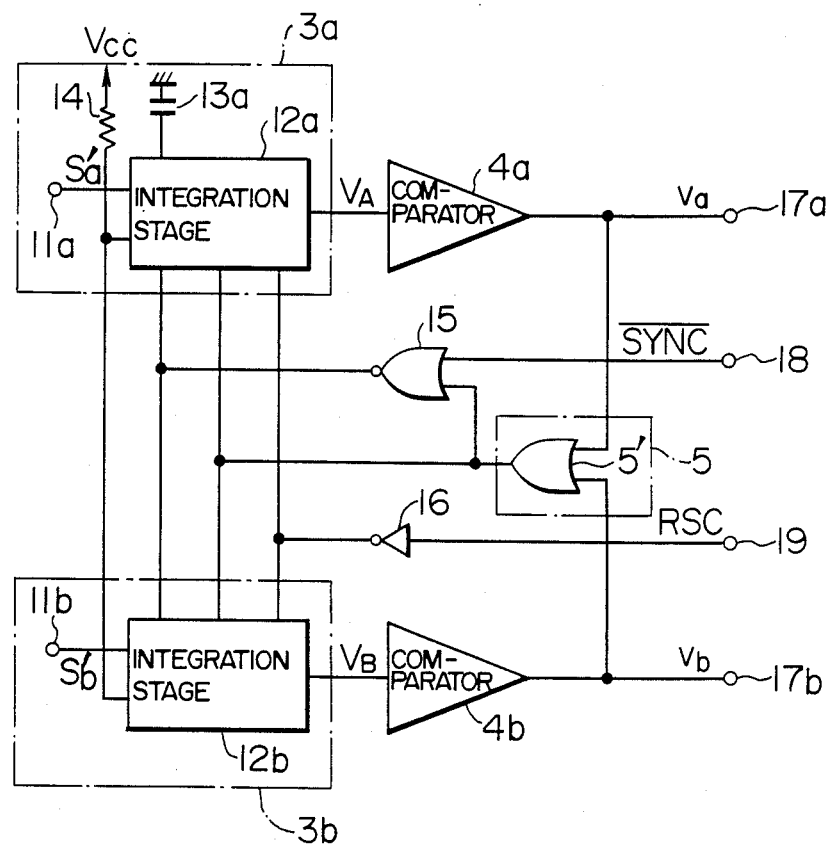
FIG. 9 is a block diagram showing in detail the structure of the integration circuits and detection circuit shown in FIG. 5.

FIG. 9 is a block diagram showing in further detail the structure of the integration circuits 3a, 3b and detection circuit 5 shown in FIG. 5. In FIG. 9, reference numeral 5' designates an OR circuit; 11a and 11b, input terminals; 12a and 12b, integration stages; 13a, a capacitor; 14, a resistor which provides together with the capacitor 13a a time constant of the integration circuit 3a; 15, a NOR circuit; 16, an inverter; 17a and 17b, output terminals; and 18 and 19, input terminals. In FIG. 9, the same reference numerals are used to designate the same or equivalent parts appearing in FIG. 5. The integration circuit 3b also includes a capacitor 13b (not shown) which provides together with the resistor 14 a time constant of the integration circuit 3a.

Referring to FIG. 9, the integration stage 12a, capacitor 13a and resistor 14a constitute the integration circuit 3a shown in FIG. 5, and the integration stage 12b, the capacitor 13b (not shown) and resistor 14b (not shown) constitute the integration circuit 3b shown in FIG. 5. The combination of the capacitor 13a and the resistor 14 form a time constant circuit in the integration circuit 3a, and the combination of the capacitor 13b (not shown) and the resistor 14b (not shown) form a time constant circuit in the integration circuit 3b. The time constants of these time constant circuits are selected to be equal to each other. The NOR circuit 15 and the inverter 16 are common to these integration circuits 3a and 3b. The OR circuit 5' acts as the detection circuit 5 shown in FIG. 5. Each of the comparators 4a and 4b compares the integration output voltage $V_A$ or $V_B$ of the integration circuit 3a or 3b with the threshold voltage $V_S$ and produces an output $v_a$ or $v_b$ which is at a high level when the output voltage $V_A$ or $V_B$ reaches the threshold $V_S$. Any one of the output $v_a$ and $v_b$, which is at the high level, is applied to the integration stages 12a and 12b through the OR circuit 5'.

In operation, the synchronizing signal $\overline{\text{SYNC}}$ and the reset signal RSC are simultaneously applied from the microcomputer 6 shown in FIG. 5 to the input terminals 18 and 19 respectively. The synchronizing signal $\overline{\text{SYNC}}$ is applied to the integration stages 12a and 12b through the NOR circuit 15, and, at the same time, the reset signal RSC is applied to the integration stages 12a and 12b through the inverter 16 to reset the integration stages 12a and 12b. As a result, both the capacitor 13a associated with the integration stage 12a and the capacitor 13b (not shown) associated with the integration stage 12b are charged to the level of the reset voltage $V_R$.

An output signal Sa' of the amplifier 2a shown in FIG. 5 is then applied to the input terminal 11a of the integration stage 12a. At this time, the resistor 14 does not act on the integration stage 12a, and the integration stage 12a operates in the proportional current integration mode in which the capacitor 13a discharges a discharge current having a value corresponding to the voltage value of the signal Sa', and an integration output voltage $V_A$ is generated from the integration stage 12a. Similarly, the integration stage 12b operates in the proportional current integration mode in response to an output signal $S_b'$ of the amplifier 2b shown in FIG. 5 and generates an integration output voltage $V_B$. The integration output voltages $V_A$ and $V_B$ are compared with the threshold voltage $V_S$ in the comparators 4a and 4b respectively. Suppose now that the camera's lens system (not shown) is not in the position of sharp focusing, and the voltage value of the signal $S_a'$ is larger than that of the signal $S_b'$. Then, the integration output voltage $V_A$ attains the level of the threshold voltage $V_S$ earlier than the integration output voltage $V_B$.

As soon as the integration output voltage $V_A$ attains the level of the threshold voltage $V_S$, the output signal $V_a$ of the comparator 4a is inverted to its "H" level of its "L" level. This output signal $V_a$ of "H" level is applied from the output terminal 17a to the input terminal a of the microcomputer 6 shown in FIG. 5. This output signal $V_a$ is also applied to the OR circuit 5'. As soon as the output signal $V_a$ of the comparator 4a is inverted from its "L" level to its "H" level, the microcomputer 6 starts to measure the aforementioned period of time T. An output signal of "H" level appears also from the OR circuit 5'. Therefore, the resistors 14a and 14b act on the integration stages 12a and 12b, and the integration stages 12a and 12b operate in the fixed current integration mode with the time constants of the associated time constant circuits respectively.

When the integration output voltage $V_B$ of the integration stage 12b attains the level of the threshold voltage $V_S$ after the mode change-over from the proportional current integration mode to the fixed current integration mode, the output signal $V_b$ of the comparator 4b is inverted from its "L" level to its "H" level. This output signal $V_b$ of "H" level is applied to the OR circuit 5' and to the input terminal b of the microcomputer 6 through the output terminal 17b. As soon as the output signal $V_b$ of the comparator 4b is inverted from its "L" level to its "H" level, the microcomputer 6 ceases the measurement of the period of time T and produces a focusing signal.

When the voltage value of the output signal $S_b'$ of the amplifier 2b is larger than that of the output signal $S_a'$ of the amplifier 2a, the integration output voltage $V_B$ attains the level of the threshold voltage $V_S$ earlier than the integration output voltage $V_A$. In this case, the operation mode of the integration stages 12a and 12b is changed over from the proportional current integration mode to the fixed current integration mode as soon as the output signal $V_b$ of the comparator 4b is inverted from its "L" level to its "H" level.

Figure 10:
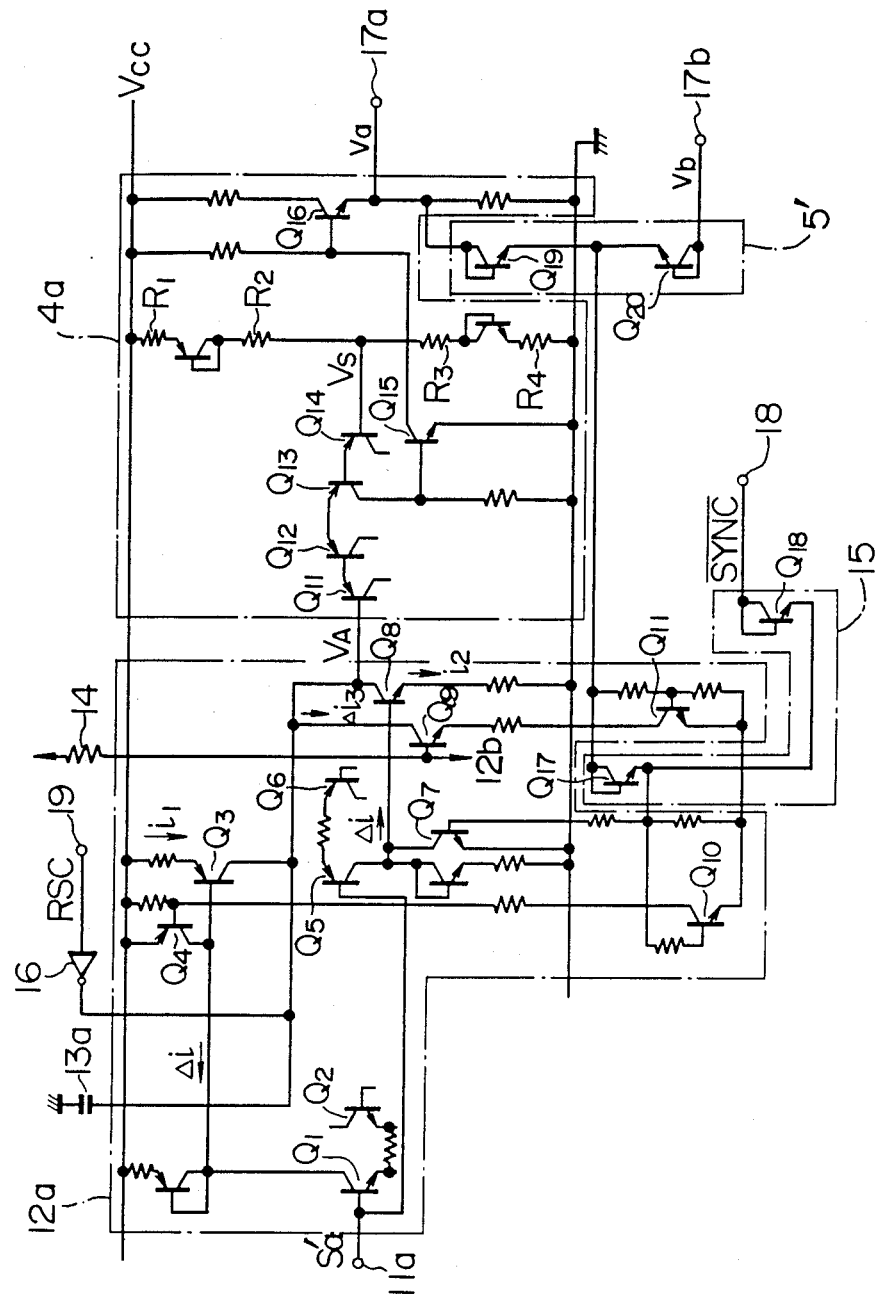
FIG. 10 is a circuit diagram showing a practical structure of the circuits shown in FIG. 9.

FIG. 10 is a circuit diagram showing a practical structure of the circuits shown in FIG. 9. In FIG. 10, reference symbols $Q_1$ to $Q_{20}$ and $R_1$ to $R_4$ designate transistors and resistors respectively, and the same reference numerals are used to designate the same or equivalent parts appearing in FIG. 9. Since the structure and operation of the integration stages 12a and 12b are the same, and those of the comparators 4a and 4b are also the same, one of each of these pairs, that is, the integration stage 12a and the comparator 4a are only shown in FIG. 10 to avoid complexity of illustration.

The NOR circuit 15 is actually composed of the transistors $Q_4$, $Q_7$, $Q_{10}$, $Q_{17}$ and $Q_{18}$. In FIG. 10, however, the transistors $Q_{17}$ and $Q_{18}$ only among them are surrounded by one-dot chain lines to avoid complexity of the drawing. Referring to FIG. 10, in response to the application of the synchronizing signal $\overline{SYNC}$ to the input terminal 18, an "H" level appears at the emitter of the diode-connected transistor $Q_{18}$ to turn on the npn transistors $Q_7$ and $Q_{10}$ in the NOR circuit 15. When the transistor $Q_7$ is turned on, the npn transistor $Q_8$ is grounded at its base and turned off. Also, because the transistor $Q_{10}$ is turned on, the pnp transistor $Q_4$ is turned on due to its base voltage fall, and, as a result, the pnp transistor $Q_3$ is turned off due to its base voltage rise. The turning-off of the transistors $Q_3$ and $Q_8$ shuts off the path of discharge current of the capacitor 13a.

At the same time, the reset signal RSC applied from the input terminal 19 is applied to the capacitor 13a through the inverter 16, and the capacitor 13a is charged to the level of the reset voltage $V_R$. As a result, an integration output voltage $V_A$ equal to the reset volta $V_R$ appears at the collector of the transistor $Q_8$ in the integration stage 12a.

After the application of the synchronizing signal E,ovs/SYNC/ and reset signal RSC, the transistors $Q_7$ and $Q_{10}$ are turned off, and the transistors $Q_8$ and $Q_3$ are turned on in turn to establish the discharge current path for the capacitor 13a.

In the meantime, the output signal $S_a'$ of the amplifier 2a shown in FIG. 5 is applied to the input terminal 11a. From the input terminal 11a, this signal $S_a'$ is applied, on one hand, to the base of the transistor $Q_3$ through the differential amplifier composed of the transistors $Q_1$ and $Q_2$ and, on the other hand, to the base of the transistor $Q_8$ through the differential amplifier composed of the transistors $Q_5$ and $Q_6$. As a result, a current proportional to the voltage value of the signal $S_a'$ flows from the emitter of the transistor $Q_3$ to the transistor $Q_1$ through the base of the transistor $Q_3$, and the same current flows from the transistor $Q_5$ to the base of the transistor $Q_8$.

When now no beam spot is formed on the center-split light sensor 1 in FIG. 5, and no current flows in the light-receiving elements 1a and 1b, the voltage value of the signal $S_a'$ applied to the input terminal 11a is maximum. The voltage value of the signal $S_a'$ becomes smaller as current flow in the light-receiving elements 1a and 1b increases due to an increase in the amounts of light received by the light-receiving elements 1a and 1b. Also, currents $i_1$ and $i_2$ flowing through the respective transistors $Q_3$ and $Q_8$, when the center-split light sensor 1 is not receiving any beam spot, are equal to each other. In such a case, therefore, the capacitor 13a does not discharge, and the integration output voltage $V_A$ of the integration stage 12a is held at the level of the reset voltage $V_R$.

When the voltage value of the signal $S_a'$ is smaller than its maximum, the value of current flowing through the transistor $Q_3$ is $(i_1 - \Delta i)$, and that flowing through the transistor $Q_8$ is $(i_2 + \Delta i)$, where $\Delta i$ is the value of current flowing from the base of the transistor $Q_3$ to the transistor $Q_1$ and that flowing from the transistor $Q_5$ to the base of the transistor $Q_8$. Therefore, the value of the discharge current of the capacitor 13a is $(i_2 + \Delta i) - (i_1 - \Delta i) = 2\Delta i$. This current value $2\Delta i$ is proportional to the voltage value of the signal $S_a'$ applied to the input terminal 11a. Thus, the integration output voltage $V_A$ of the integration stage 12a decreases in proportion to the voltage value of the signal $S_a'$. That is, the integration stage 12a operates in the so-called proportional current integration mode.

In the comparator 4a, this integration output voltage $V_A$ is compared with a predetermined threshold voltage $V_S$ in its comparation stage composed of the transistors $Q_{11}$ to $Q_{14}$. This threshold voltage $V_S$ is determined by the power supply voltage $V_{CC}$ and the resistance values of the resistors $R_1$ to $R_4$.

When the integration output voltage $V_A$ is higher than the threshold voltage $V_S$, the transistor $Q_{13}$ is turned on, and the transistor $Q_{15}$ is also turned on. As a result, the transistor $Q_{16}$ is grounded at its base and is in its off state. Therefore, the output signal $V_a$ appearing at the output terminal 17a of the comparator 4a is in its "L" level. As the integration output voltage $V_A$ decreases gradually until it becomes lower than the threshold voltage $V_S$, the transistors $Q_{13}$ and $Q_{15}$ are turned off to turn on the transistor $Q_{16}$, and the output signal $V_a$ of "H" level appears at the output terminal 17a of the comparator 4a.

This output signal $V_a$ of the "H" level is applied to the base of the transistor $Q_{11}$ through the diode-connected transistor $Q_{19}$ in the OR circuit 5' and is also supplied to the bases of the transistors $Q_7$ and $Q_{10}$ through the transistor $Q_{17}$ in the NOR circuit 15, thereby turning on these transistors $Q_{11}$, $Q_7$ and $Q_{10}$. When the transistors $Q_7$ and $Q_{10}$ are turned on, the transistors $Q_8$ and $Q_3$ are turned off as described already. Also, when the transistor $Q_{11}$ is turned on, the transistor $Q_9$ is turned on.

Because the transistors $Q_3$ and $Q_8$ are now turned off, the discharge current path for the capacitor 13a is shut off, and the proportional current integration based on the signal $S_a'$ is not carried out. However, a new discharge current path through the transistors $Q_9$ and $Q_{11}$ is now established. In this case, a current $\Delta i_3$ having a fixed value determined by the resistance value of the resistor 14, which is commonly used for the integration stage 12b, flows through the transistor $Q_9$. Therefore, irrespective of the voltage value of the signal $S_a'$, the capacitor 13a discharges the fixed current $\Delta i_3$. That is, the so-called fixed current integration is carried out. Similarly, the operation mode of the integration stage 12b is changed over at the same time from the proportional current integration mode to the fixed current integration mode.

Suppose then the case where the integration output voltage $V_B$ of the integration stage 12b attains the level of the threshold voltage $V_S$ earlier than the integration output voltage $V_A$ of the integration stage 12a. When the integration stage 12a is operating in the proportional current integration mode, and the output signal $V_a$ of the comparator 4a is in its "L" level, the output signal $V_b$ of the comparator 4b (FIG. 9) appearing at the output terminal 17b is inverted from its "L" level to its "H" level. This signal $V_b$ of "H" level is applied to the integration stages 12a and 12b through the diode-connected transistor $Q_{20}$ in the OR circuit 5'. Therefore, in this case too, the operation mode of the integration stages 12a and 12b are changed over from the proportional current integration mode to the fixed current integration mode.

Figure 11:
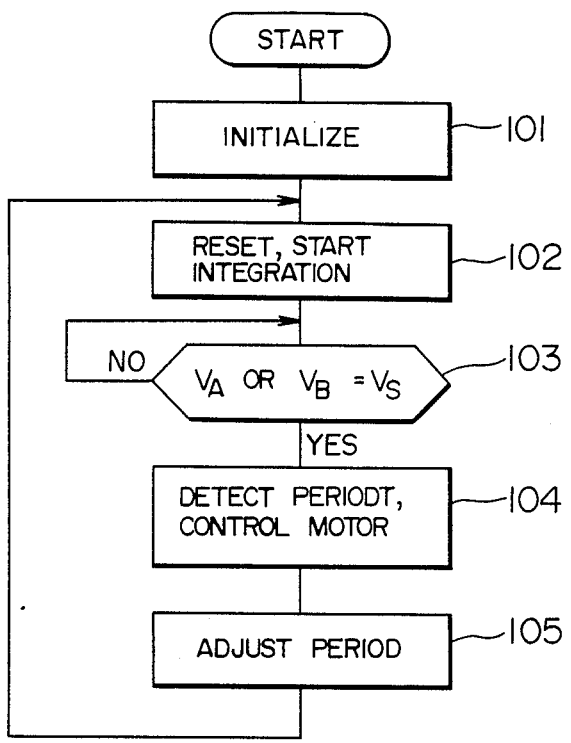
FIG. 11 is a flow chart of steps of processing by the microcomputer shown in FIG. 5.

FIG. 11 is a flow chart illustrating the operation of the microcomputer 6 provided in the automatic focusing device of the present invention shown in FIG. 5.

In a step 101 in FIG. 11, the microcomputer 6 is initialized. In steps 102 to 104, the period of time T is detected after resetting the integration circuits 3a and 3b to produce the focusing signal on the basis of the detected period of time T. As an example, this focusing signal is such that its period $B_T$ is constant, and its duty factor is variable according to the detected period of time T. The processing in the steps 102 to 104 is completed within one period $B_T$ of the focusing signal.

Therefore, each time the period of time T is detected, each period $B_T$ of the focusing signal is formed. Since the detected period of time T is variable depending on the ratio between the amounts of light received by the light-receiving elements 1a and 1b on the center-split light sensor 1, a step 105 is provided in which processing for "period adjustment" is executed. The program is scheduled so that the period of time required for processing the loop consisting of the steps 102 to 105 coincides with one period $B_T$ of the focusing signal.

Figure 12:
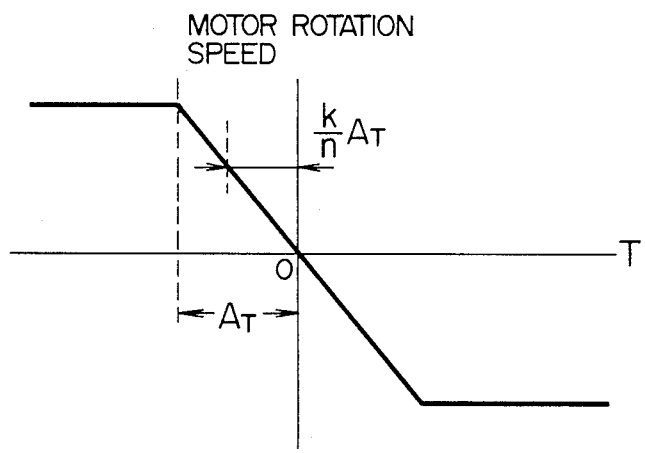
FIG. 12 is a graph showing an ideal relation between tee period of time detected by the microcomputer shown in FIG. 5 and the rotation speed of the motor shown in FIG. 5.

In the illustrated embodiment of the present invention, the focusing signal is produced so that the relation between the detected period of time T and the rotation speed of the motor 9 shown in FIG. 5 is represented ideally by a linear characteristic curve as shown in FIG. 12. In this case, the detected period of time T has a 1:1 correspondence with the amount of displacement of the received beam spot on the center-split light sensor 1.

Figure 13:
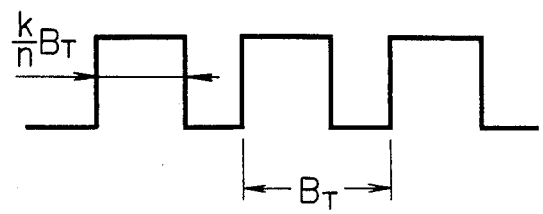
FIG. 13 shows, by way of example, the waveform of the focusing signal generated from the microcomputer shown in FIG. 5.

In FIG. 12, the symbol $A_T$ designates the period of time T corresponding to the highest rotation speed of the motor 9. When this period of time $A_T$ corresponds to the period $B_T$ of the focusing signal, the duty factor of the focusing signal is proportional to the ratio of the detected period of time T to the maximum period of time $A_T$. When now this ideal characteristic curve is approximated by a stepped characteristic curve consisting of n stages, the duty factor of the focusing signal is k/n as shown in FIG. 13 when the detected period of time T is $A_T$. Thus, as shown in FIG. 13, the focusing signal is a periodic signal in which $B_T$ is an off period and $$\left(1 - \frac{k}{n} B_T\right)$$

is an off period.

It will thus be seen that the more the amount of displacement of the received beam spot on the center-split light sensor 1, the rotation speed of the motor 9 is higher, while the less the amount of beam spot displacement, the rotation speed of the motor 9 is lower. Consequently, the automatic focusing device can very smoothly and stably attain its focusing operation by quickly responding to the beam spot displacement without causing the problem of hunting. In the present invention, the motor rotation speed characteristic curve may be approximated by a stepped characteristic curve consisting of n stages. In such a case, the duty factor of the focusing signal is preferably set at k/n which is proportional to the ratio of the detected period of time T to $A_T$ representing the period of time corresponding to the highest rotation speed of the motor 9. Such a control can be attained by the microcomputer 6, and the hardware parts including as many as n comparators are unnecessary thereby simplifying the structure and reducing the cost of the focusing device.

I claim:

1. An automatic focusing device comprising:
   light sensing means including first and second light-receiving elements for receiving light from an object to be focussed and producing outputs, respectively, representing intensity of lights received by said first and second light-receiving element;
   integrating means including first and second integration circuits connected to said first and second light-receiving elements, respectively, each of said first and second integration circuits being selectively operated in one of a proportional integration mode for integrating a predetermined value at a rate proportional to the output of the associated light-receiving element and a constant rate integration mode for integrating at a predetermined constant rate;

comparing means including first and second comparators connected to said first and second integration circuits, respectively, each of said first and second comparators comparing and integration output of the associated integration circuit with a predetermined reference value and generating an output signal when the integration output of said associated integration circuit reaches the predetermined reference value; and control means including mode control means for controlling the operating mode of said integrating circuit so that each of said first and second integrating circuits initially operate in the proportional integration mode and, upon generation of a first output signal of one of said first and second comparators, said mode control means causes the one of the first and second integration circuits associated with the other of said first and second comparators to operate in the constant rate integration mode, and determining means for determining a focusing signal based on a time interval between a first time point when the first output signal of said one of said first and second comparators is generated and a second time point when a second output signal is generated by said other of said first and second comparators.

2. An automatic focusing device according to claim 1, wherein each of said first and second integration circuits includes a capacitor initially charged at a predetermined voltage level, a first discharge circuit for discharging said capacitor at a rate proportional to the output of the associated light-receiving element and a second discharging circuit for discharging said capacitor at said constant rate.

3. An automatic focusing device comprising:

light sensing means of a center-split type including first and second light-receiving elements for receiving light from an object to be focussed and producing outputs, respectively, representing intensity of light received by said first and second light-receiving elements;

time constant means including first and second time constant circuit with each said first and second time constant circuit having a same time constant;

first integration means selectively connected to one of said first light-receiving element and said first time constant circuit, so that said first integration means integrates a predetermined value at a rate proportional to the value of said first light-receiving element when said first integration means is connected to said first light-receiving element, and said first integration means integrates at a constant rate which is determined by said time constant when said first integration means is connected to said first time constant circuit;

second integration means selectively connected to one of said second light-receiving element and said second time constant circuit, so that said second integration means integrates said predetermined value at a rate proportional to the output of said second light-receiving element when said second integration means is connected to said second light-receiving element, and said second integration means integrates at a constant reate which is determined by said time constant when said second integration means is connected to said second time constant circuit;

comparing means including first and second comparators connected to said first and second integration means, respectively, each for comparing an output of the associated integration means with a predetermined reference value and generating an output signal when the output of said associated integration means reaches the reference value; and control means including means for initially connecting said first and second integration means to said first and second light-receiving elements, respectively, so that said first and second integration means integrate the predetermined value at a rate proportional to the outputs of said first and second light-receiving circuits, respectively and then changing, upon generation of a first output signal of one of said first and second comparators which generates earlier than the output of the other of said first and second comparators, so that the one of said first and second integration means associated with said other of said first and second comparators is connected to the time constant circuit associated therewith and integrates at a constant rate, and means for producing a focusing signal based on a time interval between a first time point when said first output signal of said one of said first and second comparators is generated and a second time point when a second output signal is generated by said other of said first and second comparators.

4. An automatic focusing device according to claim 3, wherein said control means is a microcomputer.

* * * * *